US 8,103,572 B2

(12) United States Patent
Penzak (10) Patent No.: US 8,103,572 B2
(45) Date of Patent: *Jan. 24, 2012

(54) SYSTEM, METHOD, AND COMPUTER READABLE MEDIUM FOR ALLOCATING DIVIDENDS TO A BLOCK OF COMMON STOCK SHARES

(76) Inventor: Jason Penzak, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/156,428

(22) Filed: Jun. 9, 2011

(65) Prior Publication Data

US 2011/0238595 A1 Sep. 29, 2011

Related U.S. Application Data

(63) Continuation of application No. 12/277,521, filed on Nov. 25, 2008, now Pat. No. 7,987,131.

(51) Int. Cl.
*G06Q 40/00* (2006.01)
(52) U.S. Cl. ............... 705/36 R; 705/35; 705/37
(58) Field of Classification Search ............. 705/35, 705/36 R, 37
See application file for complete search history.

(56) References Cited

U.S. PATENT DOCUMENTS

| | | | | |
|---|---|---|---|---|
| 7,818,239 B1 * | 10/2010 | Davis et al. | ............. | 705/36 R |
| 2002/0052819 A1 * | 5/2002 | Burton | ............. | 705/36 |
| 2002/0103852 A1 * | 8/2002 | Pushka | ............. | 709/203 |
| 2002/0161684 A1 * | 10/2002 | Whitworth | ............. | 705/36 |
| 2004/0181475 A1 * | 9/2004 | Haroon | ............. | 705/35 |
| 2004/0225585 A1 * | 11/2004 | Hoffman | ............. | 705/35 |
| 2005/0004854 A1 * | 1/2005 | Jones et al. | ............. | 705/35 |
| 2005/0080704 A1 * | 4/2005 | Erlach et al. | ............. | 705/36 |
| 2005/0125323 A1 * | 6/2005 | Warren | ............. | 705/35 |
| 2007/0250425 A1 * | 10/2007 | Jamieson et al. | ............. | 705/36 R |
| 2007/0265950 A1 * | 11/2007 | Reuss | ............. | 705/36 R |
| 2008/0275750 A1 * | 11/2008 | Robinson et al. | ............. | 705/8 |

OTHER PUBLICATIONS

Richard Ruback, "Coercive Dual Class Exchange Offers," Feb. 1987, Sloan School of Management, MIT, pp. 1-34.*

* cited by examiner

*Primary Examiner* — Jagdish Patel
*Assistant Examiner* — Kenneth Bartley
(74) *Attorney, Agent, or Firm* — Cantor Colburn LLP (57) ABSTRACT

A system, a method, and a computer readable medium for allocating dividends to a block of common stock shares are provided. The method includes selling a plurality of Class A common stock shares and a plurality of Class No-Dividend common stock shares associated with the company, that form the block of common stock shares. The method further includes determining a total dividend amount for the block of common stock shares. The method further includes allocating a first percentage of the total dividend amount to the plurality of Class A common stock shares, and allocating a second percentage of the total dividend amount to the plurality of Class No-Dividend common stock shares. The method further includes performing a share buyback of a predetermined number of Class No-Dividend common stock shares of the plurality of Class No-Dividend common stock shares equal to the second percentage of the total dividend amount.

20 Claims, 4 Drawing Sheets

SYSTEM, METHOD, AND COMPUTER READABLE MEDIUM FOR ALLOCATING DIVIDENDS TO A BLOCK OF COMMON STOCK SHARES

CROSS REFERENCE TO RELATED APPLICATIONS

The present application is a continuation of U.S. patent application Ser. No. 12/277,521 filed Nov. 25, 2008, the contents of which are incorporated herein by reference thereto.

TECHNICAL FIELD

This application relates generally to a system, a method, and a computer readable medium for allocating dividends to a block of common stock shares.

BACKGROUND OF THE INVENTION

Investors can be placed into two categories: those who prefer to receive dividends and those who do not. Proponents of dividends claim that they are a sign of corporate health and provide shareholders with a relatively stable form of cash value. Opponents of dividends claim that they create uncontrollable taxable events as well as potentially force investors to incur reinvestment costs.

Typically, companies have chosen to satisfy the preferences of the proponents of dividends by forcing all shareholders to pay dividend taxes, incur reinvestment transaction costs and to invest sub-optimally. Companies do buy back their shares but this occurs relatively infrequently and generally cannot be predicted by the shareholders.

Accordingly, the inventor herein has recognized a need for an improved system and method for allocating dividends to a common block of shares that minimizes and/or eliminates the above-mentioned inefficiencies.

SUMMARY OF THE INVENTION

A method for allocating dividends to a block of common stock shares in accordance with an exemplary embodiment is provided. The method includes selling a plurality of Class A common stock shares associated with a company, utilizing a stock exchange computer. The method further includes selling a plurality of Class No-Dividend common stock shares associated with the company, utilizing the stock exchange computer. The plurality of Class A common stock shares and the plurality of Class No-Dividend common stock shares form the block of common stock shares. The method further includes determining a total dividend amount for the block of common stock shares, utilizing a client computer. The method further includes allocating a first percentage of the total dividend amount to the plurality of Class A common stock shares, utilizing the client computer. The method further includes allocating a second percentage of the total dividend amount to the plurality of Class No-Dividend common stock shares utilizing the client computer. The method further includes performing a share buyback of a predetermined number of Class No-Dividend common stock shares of the plurality of Class No-Dividend common stock shares, utilizing a monetary amount substantially equal to the second percentage of the total dividend amount, utilizing the stock exchange computer. The method further includes distributing the first percentage of the total dividend amount to dividend accounts of owners of the Class A common stock shares, utilizing the client computer.

A system for allocating dividends to a block of common stock shares in accordance with another exemplary embodiment is provided. The system includes a stock exchange computer configured to sell a plurality of Class A common stock shares associated with a company. The stock exchange computer is further configured to sell a plurality of Class No-Dividend common stock shares associated with the company, the plurality of Class A common stock shares and the plurality of Class No-Dividend common stock shares forming the block of common stock shares. The system further includes a client computer operably communicating with the stock exchange computer. The client computer is configured to determine a total dividend amount for the block of common stock shares. The client computer is further configured to allocate a first percentage of the total dividend amount to the plurality of Class A common stock shares. The client computer is further configured to allocate a second percentage of the total dividend amount to the plurality of Class No-Dividend common stock shares. The client computer is further configured to instruct the stock exchange computer to perform a share buyback of a predetermined number of Class No-Dividend common stock shares of the plurality of Class No-Dividend common stock shares, utilizing a monetary amount substantially equal to the second percentage of the total dividend amount. The client computer is further configured to distribute the first percentage of the total dividend amount to dividend accounts of owners of the Class A common stock shares.

At least one computer readable medium having computer-executable instructions for performing a method for allocating dividends to a block of common stock shares in accordance with another exemplary embodiment is provided. The method includes selling a plurality of Class A common stock shares associated with a company, utilizing a stock exchange computer. The method further includes selling a plurality of Class No-Dividend common stock shares associated with the company, the plurality of Class A common stock shares and the plurality of Class No-Dividend common stock shares forming the block of common stock shares, utilizing the stock exchange computer. The method further includes determining a total dividend amount for the block of common stock shares, utilizing a client computer. The method further includes allocating a first percentage of the total dividend amount to the plurality of Class A common stock shares, utilizing the client computer. The method further includes allocating a second percentage of the total dividend amount to the plurality of Class No-Dividend common stock shares, utilizing the client computer. The method further includes performing a share buyback of a predetermined number of Class No-Dividend common stock shares of the plurality of Class No-Dividend common stock shares, utilizing a monetary amount substantially equal to the second percentage of the total dividend amount, utilizing the stock exchange computer. The method further includes distributing the first percentage of the total dividend amount to dividend accounts of owners of the Class A common stock shares, utilizing the client computer.

DETAILED DESCRIPTION OF EXEMPLARY EMBODIMENTS

Figure 1:
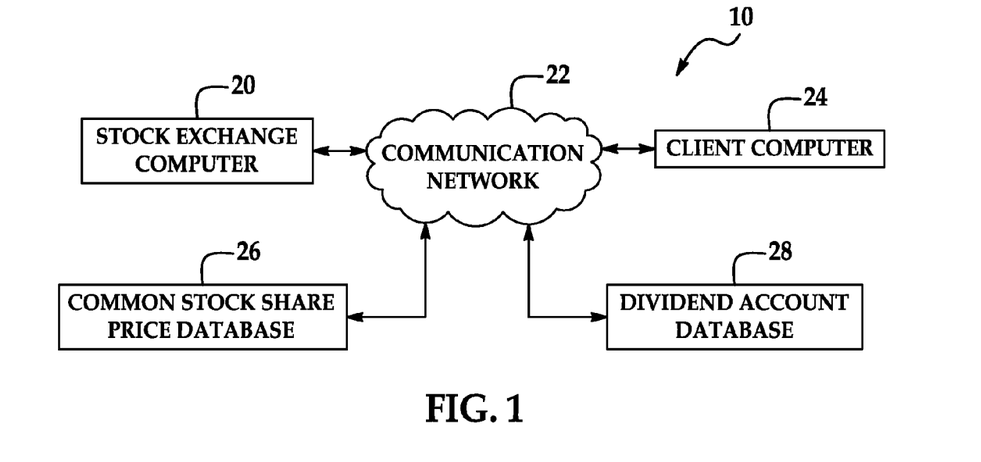
FIG. 1 is a schematic of a system that maintains control over outstanding Class A common stock shares and Class No-Dividend common stock shares along with dividends attributable to each class of stock in accordance with an exemplary embodiment.

Referring to FIG. 1, a system 10 for allocating dividends to a block of common stock shares is provided. The system 10 includes a stock exchange computer 20, a communication network 22, a client computer 24, a common stock share price database 26, and a dividend account database 28. It should be noted that the term "company" means any legal entity that can issue common stock shares. The term "stock share" means a share of ownership of a company. Further, the term "share buyback" or "buyback" (also referred to as share repurchase) refers to a company buying back its own stock shares. Thereafter, the company retires (or holds in Treasury inventory) the buyback stock shares. The term "percentage" refers to either an actual percentage value or a decimal equivalent. The term "stock exchange computer" refers to any device or computer configured to initiate a request for a stock transaction or to perform the stock transaction, such a sell transaction or a buy transaction for example. The term "client computer" refers to any device or computer configured to communicate with another device or computer. The term "computer" refers to any device configured to perform a logical operation or an arithmetic operation.

A general overview of a methodology utilized by the system 10 will now be explained. In particular, the methodology is designed to satisfy both groups of investors, those who prefer to receive dividends from common stock and those who do not prefer to receive dividends. In particular, the methodology creates an additional class of common stock, called Class No-Dividend common stock shares, that are traded alongside standard Class A common stock shares of the same company. The Class No-Dividend common stock shares and the Class A common stock shares form a block of common stock shares. The methodology is intended for companies that plan to continue paying dividends to its Class A common Stock shareholders. The Class No-Dividend common stock shares have characteristics similar to Class A common stock shares, but instead of receiving dividends, an amount of money that the company would normally set aside to pay dividends to Class No-Dividend common stock shares is used to buy back other Class No-Dividend common stock shares. This methodology therefore concentrates the dividend value of the outstanding Class No-Dividend common stock shares into its market price on a pre-tax basis that are traded in the marketplace.

The Class No-Dividend common stock shares enhance returns for long-term investors by deferring payment of taxes, reducing transaction costs and allowing the investor to avoid investing at inopportune times. Further, as compared to Class A common stock shares, a change in value of Class No-Dividend common stock shares over time more accurately reflects a true financial performance of the company because it captures total return to shareholders. Therefore, Class No-Dividend common stock shares are arguably a better basis for various forms of management compensation such as stock options, stock appreciation rights, and stock grants than if based on existing Class A common stock shares.

The stock exchange computer 20 is configured to perform requests to buy or sell Class A common stock shares and Class No-Dividend common stock shares of a company, in response to requests from the client computer 24. The stock exchange computer 20 is further configured to be able to convert a certain number or percent of Class A common stock shares into Class No-Dividend common stock shares as directed from the client computer 24 using the information in dividend account database 28. The stock exchange computer 20 is further configured to be able to issue a certain number of Class No-Dividend common stock shares to owners of existing Class A common stock shares in accordance with direction from the client computer 24 using the information in dividend account database 28. The stock exchange computer 20 is further configured to retrieve current trading prices of Class A common stock shares and Class No-Dividend common stock shares from the common stock share price database 26. As shown, the stock exchange computer 20 is operably coupled to a communication network 22. The communication network 22 is further operably coupled to the client computer 24, the common stock share price database 26, and the dividend account database 28.

The client computer 24 is configured to send requests to the stock exchange computer 20 to buy or sell Class A common stock shares and Class No-Dividend common stock shares of a company. The client computer 24 is further configured to store data indicating dividend amounts in dividend accounts of stock share owners stored in the dividend account database 28. The client computer 24 is further configured to perform additional calculations as will be described in greater detail below and to store determined values in an internal memory device.

Figure 2:
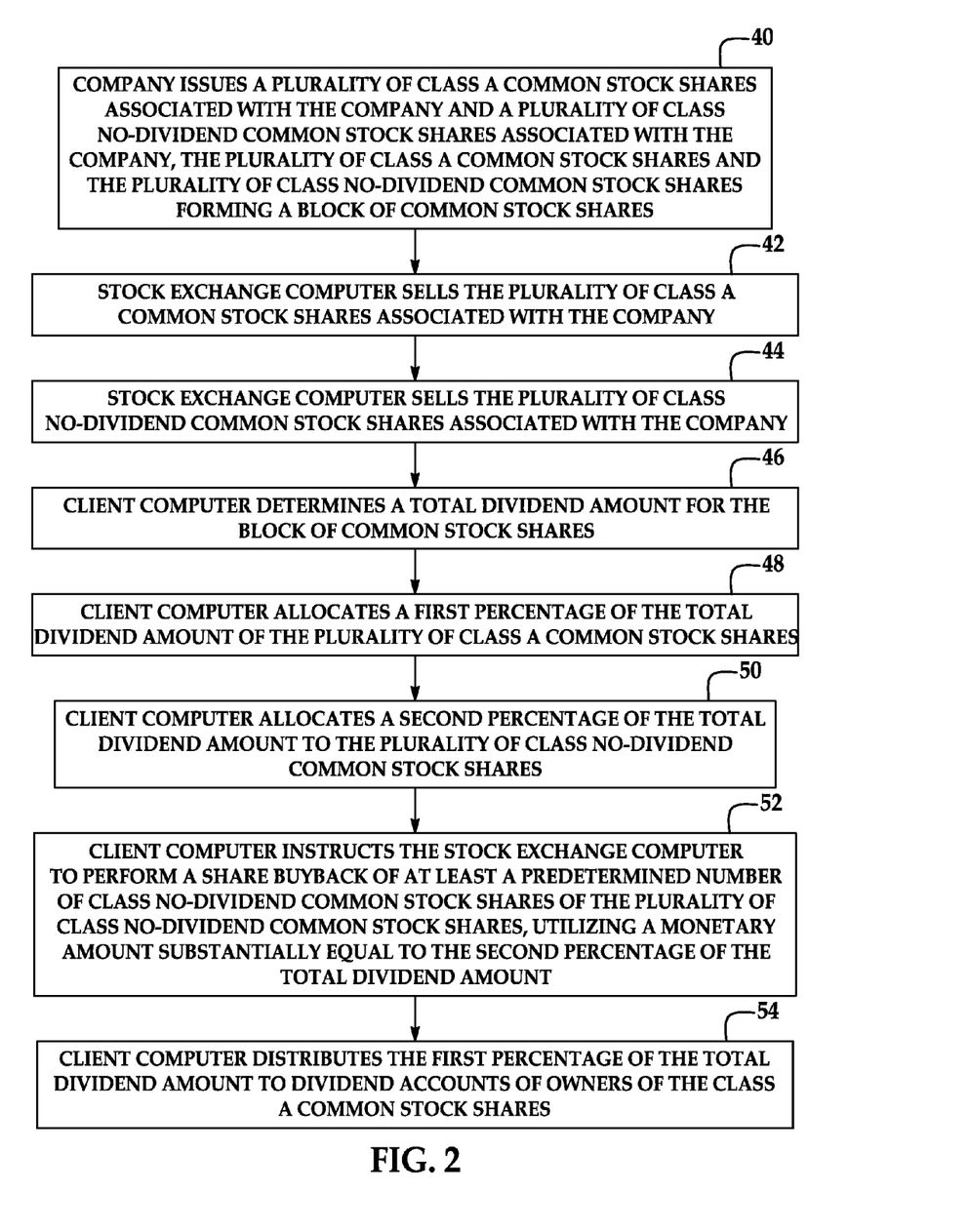
FIG. 2 is a flowchart of a method for allocating dividends to a block of common stock shares in accordance with another exemplary embodiment.

Referring to FIG. 2, a flowchart of a method for allocating dividends to a block of common stock shares in accordance with another exemplary embodiment will now be explained. The method can be implemented utilizing the system 10 described above.

At step 40, a company issues a plurality of Class A common stock shares associated with the company and a plurality of Class No-Dividend common stock shares associated with the company. If the company previously issued Class A common stock shares, then the company may choose not to issue any additional Class A common stock shares and the stock exchange computer 20 can be configured to be flexible in this manner. In either case, the plurality of Class A common stock shares and the plurality of Class No-Dividend common stock shares form a block of common stock shares.

At step 42, based on direction from the client computer 24, the stock exchange computer 20 may sell or issue a plurality of Class A common stock shares associated with the company, particularly if no Class A common stock shares previously exist.

At step 44, based on direction from the client computer 24, the stock exchange computer 20 may sell or issue a plurality of Class No-Dividend common stock shares associated with the company.

At step 46, the client computer 24 determines a total dividend amount for the block of common stock shares, both Class A common stock shares and Class No-dividend common stock shares.

At step 48, the client computer 24 allocates a first percentage of the total dividend amount to the plurality of Class A common stock shares.

At step 50, the client computer 24 allocates a second percentage of the total dividend amount to the plurality of Class No-Dividend common stock shares.

At step 52, the client computer 24 instructs the stock exchange computer 20 to perform a share buyback of a predetermined number of Class No-Dividend common stock shares of the plurality of Class No-Dividend common stock shares, utilizing a monetary amount substantially equal to the second percentage of the total dividend amount.

At step 54, the client computer 24 distributes the first percentage of the total dividend amount to dividend accounts of owners of the Class A common stock shares. In one exemplary embodiment, the client computer 24 stores data indicating a distribution or dividend amount equal to the first percentage of the total dividend amount in dividend accounts of owners of the Class A common stock shares, on the dividend account database 28.

Figure 3:
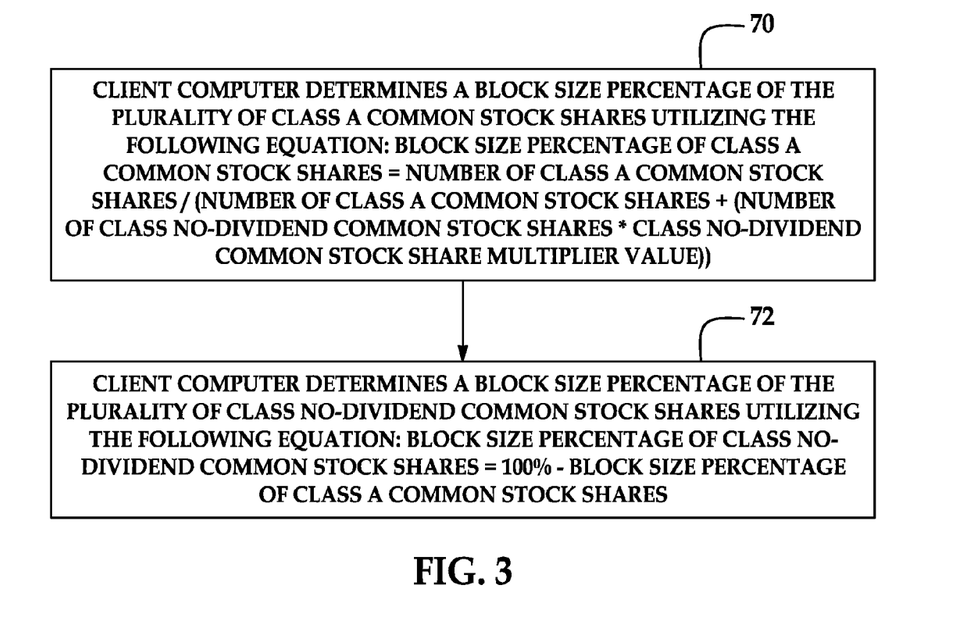
FIG. 3 is a flowchart of a method for determining the block size percentages of Class A common stock shares and the Class No-Dividend common stock shares.

Referring to FIG. 3, a flowchart of a method for determining the block size percentages of the Class A common stock shares and the Class No-Dividend common stock shares will now be explained.

At step 70, the client computer 24 determines a block size percentage of the plurality of Class A common stock shares utilizing the following equation: Block size percentage of Class A common stock shares=number of Class A common stock shares/(number of Class A common stock shares+ (number of Class No-Dividend common stock shares*Class No-Dividend common stock share multiplier value)).

At step 72, the client computer 24 determines a block size percentage of the plurality of Class No-Dividend common stock shares utilizing the following equation: Block size percentage of Class No-Dividend common stock shares=100%− Block size percentage of Class A common stock shares.

Exemplary calculations utilizing the methodology of FIG. 3 will now be explained. Assume that an existing company has 200 Class A common stock shares outstanding. Subsequently, the company issues 100 Class No-Dividend common stock shares—via a stock split, special dividend, or other method. Further, assume that the company desires that the Class No-Dividend common stock shares trade at a nominal value of 3-times the price of Class A common stock shares. Implicitly, this would mean that the starting Class No-Dividend common stock share multiplier value would be 3.00.

For the foregoing example, the block size percentage of Class A common stock shares would be calculated as follows: 200/(200+(100×3.00))=0.4 (i.e., 40%). Further, the block size percentage of the Class No-Dividend common stock shares would be calculated as follows: 100%−40%=60%.

Figure 4:
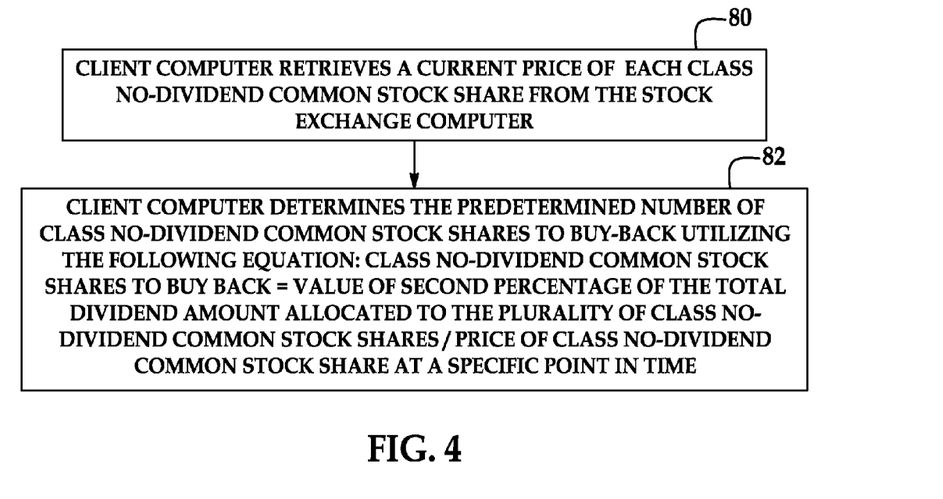
FIG. 4 is a flowchart of a method for determining a predetermined number of Class No-Dividend common stock shares for a share buyback by a company.

Referring to FIG. 4, a flowchart of a method for determining the predetermined number of Class No-Dividend common stock shares for the share buyback by the company will now be explained.

At step 80, the client computer 24 retrieves a current price of each Class No-Dividend common stock share from the stock exchange computer 20.

At step 82, the client computer 24 determines the predetermined number of Class No-Dividend common stock shares to buyback utilizing the following equation:

Class No-Dividend common stock shares to buyback=value of second percentage of the total dividend amount allocated to the plurality of Class No-Dividend common stock shares/the price of Class No-Dividend common stock share at a specific point in time.

A first set of exemplary calculations utilizing the methodology of FIG. 4 will now be explained. For this example, assume that 200 Class A common stock shares and 100 Class No-Dividend common stock shares have been sold, and a No-Dividend common stock share multiplier value equal to 3.00. Further, the price (on a particular day) of Class A common stock shares is $10 per share. Accordingly, the price of Class No-Dividend common stock shares would trade at about $30 per share based on the No-Dividend common stock share multiplier value of 3.00. Also, assume the block size percentages determined in step 72 remain unchanged. When a total dividend amount of $500 is paid to all common stock shareholders, the following events would occur. With 200 Class A common stock shares outstanding, a dividend amount of $200 ($500 total dividend*40% block size percentage of Class A common stock shares) would be paid to only Class A common stock shareholders, with each shareholder receiving $1. This equates to a 10% dividend yield ($1 Dividend/$10 price of each Class A common stock shares). The remaining dividend amount of $300 ($500 total dividend*60% block size percentage of Class No-Dividend common stock shares) is used to by the company to buy back Class No-Dividend common stock shares. Accordingly, a number of Class No-Dividend common stock shares purchased for the share buyback is calculated as follows: $300/$30=10 shares.

Also note that after the first dividend is issued (and shares are bought back), the block size percentages would still be the same, but the number of Class No-Dividend common stock shares outstanding would decrease from 100 to 90 shares. Intuitively, the No-Dividend common stock share multiplier value would start to increase as fewer Class No-Dividend common stock shares each get a larger portion of the Class No-Dividend common stock block. Further, the increase of the multiplier value is a function of the dividend yield based on the following two equations.

Change in No-Dividend common stock share multiplier value=1/(1−Class A common stock share dividend yield). In the above example, the change in the No-Dividend common stock share multiplier value=1/(1−10%)=1.11.

Updated No-Dividend common stock share multiplier value=previous No-Dividend common stock share multiplier value*change in No-Dividend common stock share multiplier value. In the above example, the updated No-Dividend common stock share multiplier value=3.00*1.11=3.33.

Figure 5:
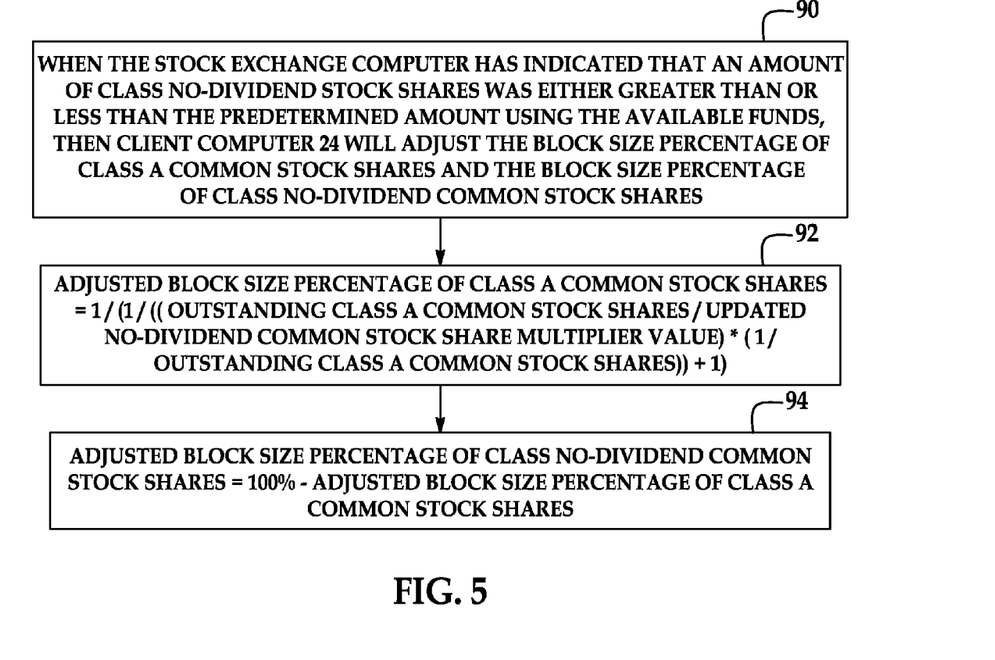
FIG. 5 is a flowchart of a method for determining an adjusted block size percentage of Class A common stock shares and an adjusted block size percentage of Class No-Dividend common stock shares.

Referring to FIG. 5, a flowchart of a method for determining an adjusted block size percentage of Class A common stock shares and an adjusted block size percentage of Class No-Dividend common stock shares if the second percentage of the total dividend amount to the plurality of Class No-Dividend common stock shares does not equal the predetermined number of Class No-Dividend common stock shares to be bought back by the company. Because the market place is dynamic and prices of these classes of shares can move dramatically in very short periods of time, it is reasonable that the buyback may involve either fewer or more shares than what was predetermined. In this case, the client computer 24 will perform the necessary adjustments to the block size percentages. Also note that the client computer 24 is programmed to keep track of the number of outstanding Class A common stock shares and the number of outstanding Class No-Dividend common stock shares.

At step 90, if the feedback from the exchange server 20 has indicated that an amount of Class No-Dividend common stock shares was either greater than or less than the predetermined amount using the available funds, then the client computer 24 will adjust the block size percentage of Class A common stock shares and the block size percentage of Class No-Dividend common stock shares using the following two equations.

At step 92, the client computer 24 determines the adjusted block size percentage of Class A common shares. Adjusted block size percentage of Class A common stock shares=1/(1/((Outstanding Class A common stock shares/Updated No-Dividend common stock share multiplier value)*(1/Outstanding Class A common stock shares))+1).

At step 94, the client computer 24 determines the adjusted block size percentage of Class No-Dividend common shares. Adjusted block size percentage of Class No-Dividend common stock shares=100%−Adjusted block size percentage of Class A common stock shares.

A second set of exemplary calculations utilizing the methodology of FIG. 5 will now be explained. Continuing with the same example described in the first set of exemplary calculations, now assume that the price of Class No-Dividend stock shares cannot be purchased at $30, but rather at an average price of $33.33, ceteris paribus. With the available funds of $300, only 9 shares can be repurchased. The number of outstanding Class A common stock shares remains unchanged at 200 and the number of outstanding Class No-Dividend common stock shares is 91 (100 shares initially issued—9 shares bought back). Using the formula from step 90, the adjusted block size percentage of Class A common stock shares would be 39.759%=1/(1/((200/3.33)*(1/91))+1). Therefore the adjusted block size percentage of Class No-Dividend common stock shares would be 60.241%=100%−39.759% block size of Class A common stock shares.

Referring to FIG. 5, a method for determining the adjusted block size percentage of Class A common stock shares and adjusted block size percentage of Class No-Dividend common stock shares in the event that either a number of Class No-Dividend common stock shares or a number of Class A common stock shares are used for management compensation and recapitalizing activities.

Continuing with assumptions in the second set of exemplary calculations, now assume that as a result of management compensation (stock options for example) or additional capital required by the company, an additional 20 Class No-Dividend common stock shares are either created or sold in the market place. The method described in FIG. 5 would then make the necessary adjustments. With the number of outstanding Class A common stock shares remaining unchanged at 200, but an increase in the number of Class No-Dividend common stock shares from 91 to 111, the client computer 24 would make the following adjustment. Also note, in this example, as no dividend is being paid, there is no change to the Updated No-Dividend common stock share multiplier, so it would remain at 3.33. Using the formula in step 92, the adjusted block size percentage of Class A common stock shares would be 35.111%=1/(1/((200/3.33)*(1/111))+1). Therefore the adjusted block size percentage of Class No-Dividend common stock shares would be 64.889%=100%−35.111% block size of Class A common stock shares.

Figure 6:
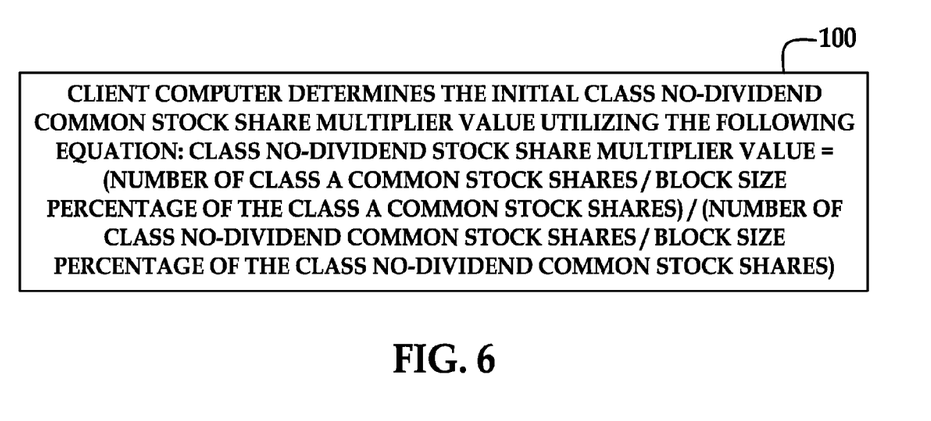
FIG. 6 is a flowchart of a method for determining an initial Class No-Dividend common stock share multiplier value.

Referring to FIG. 6, a method for determining an initial Class No-Dividend common stock share multiplier value will now be explained.

At step 100, the client computer 24 determines the initial Class No-Dividend common stock share multiplier value utilizing the following equation:

Class No-Dividend common stock share multiplier value=(number of Class A common stock shares/block size percentage of the Class A common stock shares)/(number of Class No-Dividend common stock shares/block size percentage of the Class No-Dividend common stock shares).

Exemplary calculations utilizing the methodology of FIG. 6 will now be explained. For this example, assume that the block sizes for the Class A common stock shares and the Class No-Dividend common stock shares are known, but the nominal prices per share have not been set. For example, assume that a company has 200 Class A common stock shares outstanding. Thereafter, the company issues 100 Class No-Dividend common stock shares. Also assume that the company desires that the block size percentage of Class A common shares to be about 75% and the block size percentage of Class No-Dividend Block Size to be about 25%. The No-Dividend common stock share multiplier value can be determined utilizing the following equation: No-Dividend common stock share multiplier value=(Outstanding Class A common stock shares/block size percentage of Class A common stock shares)/(Outstanding Class No-Dividend common stock shares/block size percentage of Class No-Dividend common stock shares). For example, with the above criteria, the Class No-Dividend common stock share multiplier value=(200/75%)/(100/25%)=0.667. In this example, if the Class A common stock shares were trading for $10 per share, the Class No-Dividend common stock shares should be trading for about $6.67 per share. In addition to determining the relative prices between Class A common stock shares and Class No-Dividend common stock shares, the No-Dividend common stock share multiplier value also determines the relative level of entitlement due to each shareholder. In this example, with respect to future earnings, one share of Class No-Dividend common stock share would be entitled to 66.7% of earnings that Class A common stock share would be entitled to. Also, with respect to voting, one share of Class No-Dividend common stock share would be entitled to 0.667 votes that every 1.000 vote of Class A common stock share would be entitled to. Over time, as the No-Dividend common stock share multiplier value changes, so too will the entitlements of a Class No-Dividend common stock share change relative to a Class A common stock share.

The system and the method for allocating dividends provide a substantial advantage over other systems and methods. In particular, the system and method provide a technical effect of utilizing Class No-Dividend common stock shares wherein an amount of money that the company would normally set aside to pay dividends to Class No-Dividend common stock shares is instead used to buy back other Class No-Dividend common stock shares. Accordingly, the Class No-Dividend common stock shares enhance returns for long-term investors by deferring payment of taxes, reducing transaction costs and eliminating the need for the investors to reinvest dividend proceeds at inopportune times.

Figure 7:
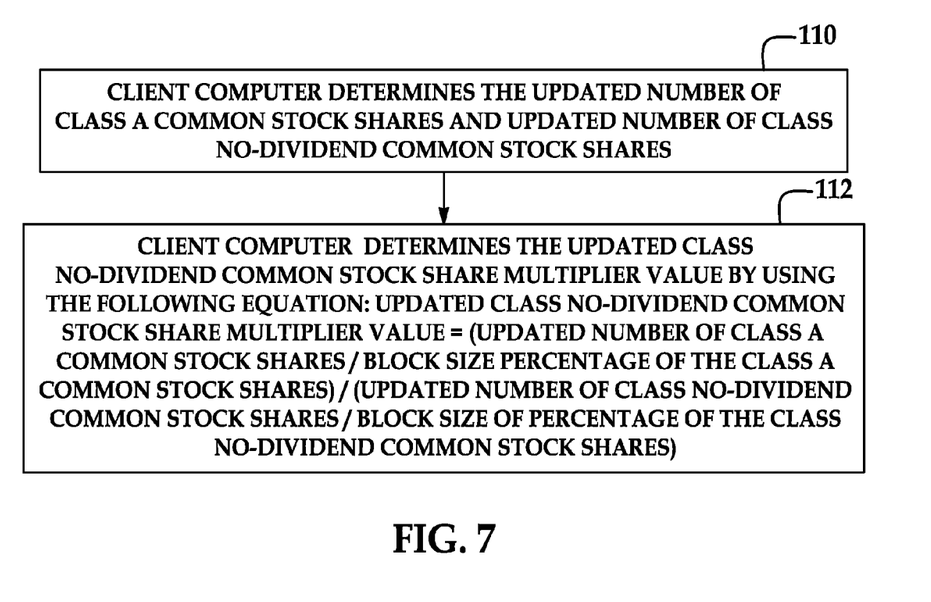
FIG. 7 is a flowchart of a method for determining the adjusted Class No-Dividend common stock share multiplier value.

Referring to FIG. 7, a method for determining the adjusted Class No-Dividend common stock share multiplier value when stock splits or reverse splits occur.

At step 110, the client computer 24, determines the updated number of class A common stock shares and updated number of Class No-Dividend common stock shares.

At step 112, the client computer 24 determines the updated Class No-Dividend common stock share multiplier value by using the following equation: Updated Class No-Dividend common stock share multiplier value=(Updated number of Class A common stock shares/block size percentage of the Class A common stock shares)/(Updated number of Class No-Dividend common stock shares/block size of percentage of the Class No-Dividend common stock shares)

Exemplary calculations utilizing the methodology of FIG. 7 will now be explained. Continuing with the assumptions in the previous example, assume that management desires to split each and every Class No-Dividend common stock share into 2 shares while at the same time splitting each and every Class A common stock share into 4 shares, ceteris paribus. Therefore, the number of Class No-Dividend common stock shares increases from 100 to 200 and the number of Class A common stock shares increases from 200 to 800. Using the same formula described in the previous paragraph, the updated Class No-Dividend common stock multiplier value would be =(800/75%)/(200/25%)=1.333.

The above-described methods can be at least partially embodied in the form of one or more computer readable medium having computer-executable instructions for practicing the method. The computer-readable medium can comprise one or more of the following: floppy diskettes, CD-ROMs, hard drives, flash memory, and other computer-readable medium known to those skilled in the art; wherein, when the computer-executable instructions are loaded into and executed by one or more computers or computer servers, the one or more computers or computer servers become an apparatus for practicing the invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Other examples of shares may include but are not limited to preferred shares, privileged voting shares, and other types of assets or derivative products that may be exploited using the basic principles outlined herein. Therefore, it is intended that the invention not be limited to the particular embodiment disclosed for carrying this invention, but that the invention will include all embodiments falling within the scope of the appended claims. Moreover, the use of the terms, first, second, etc. are used to distinguish one element from another. Further, the use of the terms a, an, etc. do not denote a limitation of quantity, but rather denote the presence of at least one of the referenced items.

What is claimed is:

1. A method for allocating dividends to a block of stock shares associated with a company, comprising:
   determining a total dividend amount for the block of stock shares having a plurality of a first type of stock shares and a plurality of a Class No-Dividend stock shares utilizing a computer;
   allocating a first percentage of the total dividend amount to the plurality of the first type of stock shares; and
   allocating a second percentage of the total dividend amount to the plurality of Class No-Dividend stock shares.

2. The method of claim 1, further comprising:
   making available the plurality of the first type of stock shares; and
   making available the plurality of Class No-Dividend stock shares.

3. The method of claim 1, further comprising:
   performing a share buyback of a number of the Class No-Dividend stock shares of the plurality of Class No-Dividend stock shares, utilizing a monetary amount substantially equal to the second percentage of the total dividend amount; and
   distributing the first percentage of the total dividend amount to dividend accounts of owners of the plurality of the first type of stock shares.

4. The method of claim 3, further comprising:
   determining a block size percentage of the plurality of the first type of stock shares based on a number of the plurality of the first type of stock shares, a number of the plurality of Class No-Dividend stock shares, and a Class No-Dividend stock share multiplier value.

5. The method of claim 4, further comprising:
   determining a block size percentage of the plurality of Class No-Dividend stock shares based on the block size percentage of the plurality of the first type of stock shares subtracted from 100%.

6. The method of claim 5, further comprising:
   determining the number of Class No-Dividend stock shares to be bought back based on the second percentage of the total dividend amount and a price of a Class No-Dividend stock share of the plurality of Class No-Dividend stock shares.

7. The method of claim 5, further comprising:
   determining the Class No-Dividend stock shares multiplier value based on the number of the plurality of the first type of stock shares, the block size percentage of the plurality of the first type of stock shares, the number of the plurality of Class No-Dividend stock shares, and a block size percentage of the plurality of Class No-Dividend stock shares.

8. The method of claim 1, wherein the plurality of the first type of stock shares comprises at least one of: a plurality of Class A common stock shares, a plurality of preferred shares, and a plurality of privileged voting shares.

9. A system for allocating dividends to a block of stock shares, comprising:
   a first computer configured to determine a total dividend amount for the block of stock shares having a plurality of a first type of stock shares and a plurality of Class No-Dividend stock shares;
   the first computer further configured to allocate a first percentage of the total dividend amount to the plurality of the first type of stock shares;
   the first computer further configured to allocate a second percentage of the total dividend amount to the plurality of Class No-Dividend stock shares.

10. The system of claim 9, wherein:
    a second computer operably communicating with the first computer, the second computer configured to sell the plurality of the first type of stock shares; and
    the second computer further configured to sell the plurality of Class No-Dividend stock shares.

11. The system of claim 9, wherein:
    the first computer further configured to instruct a second computer to perform a share buyback of a first number of Class No-Dividend stock shares of the plurality of Class No-Dividend stock shares, utilizing a monetary amount substantially equal to the second percentage of the total dividend amount; and
    the first computer further configured to distribute the first percentage of the total dividend amount to dividend accounts of owners of the plurality of the first type of stock shares.

12. The system of claim 11, wherein the first computer is further configured to adjust a block size percentage of the plurality of Class No-Dividend stock shares and a block size percentage of the plurality of the first type of stock shares if a number of Class No-Dividend stock shares bought back by the company does not equal the first number of Class No-Dividend stock shares.

13. The system of claim 11, wherein the first computer is further configured to adjust the block size percentage of the plurality of Class No-Dividend stock shares and a block size percentage of the first type of stock shares when either a first number of Class No-Dividend stock shares or a first number of the first type of stock shares are used for management compensation and recapitalizing activities.

14. The system of claim 11, wherein the first computer is further configured to determine a block size percentage of the plurality of the first type of stock shares based on a number of the plurality of the first type of stock shares, a number of the plurality of Class No-Dividend stock shares, and a Class No-Dividend stock share multiplier value.

15. The system of claim 14, wherein the first computer is further configured to determine a block size percentage of the plurality of Class No-Dividend stock shares based on the block size percentage of the plurality of the first type of stock shares subtracted from 100%.

16. The system of claim 15, wherein the first computer is further configured to determine the number of Class No-Dividend stock shares to be bought back based on the second percentage of the total dividend amount and a price of a Class No-Dividend stock share of the plurality of Class No-Dividend stock shares.

17. The system of claim 16, wherein the first computer is further configured to determine the Class No-Dividend stock share multiplier value based on the number of the plurality of the first type of stock shares, the block size percentage of the plurality of the first type of stock shares, the number of the plurality of Class No-Dividend stock shares, and a block size percentage of the plurality of Class No-Dividend stock shares.

18. The system of claim 17, wherein the first computer is further configured to adjust the Class No-Dividend stock share multiplier value when either the plurality of Class No-Dividend stock shares or the plurality of the first type of stock shares undergo a stock split or a reverse stock split.

19. The system of claim 9, wherein the plurality of the first type of stock shares comprises at least one of: a plurality of Class A common stock shares, a plurality of preferred shares, and a plurality of privileged voting shares.

20. At least one non-transitory computer readable medium having computer-executable instructions for performing a method for allocating dividends to a block of stock shares, the method comprising:
   determining a total dividend amount for the block of stock shares having a plurality of a first type of stock shares and a plurality of a Class No-Dividend stock shares;
   allocating a first percentage of the total dividend amount to the plurality of the first type of stock shares; and
   allocating a second percentage of the total dividend amount to the plurality of Class No-Dividend stock shares.

* * * * *